United States Patent [19]

Stanford et al.

[11] 4,254,896

[45] Mar. 10, 1981

[54] ICE DISPENSING MACHINE HAVING AN AGITATOR AND A FIXED DEFLECTOR

[75] Inventors: Ralph F. Stanford; Donald R. Christensen, both of Albert Lea, Minn.

[73] Assignee: King-Seeley Thermos Co., Prospect Heights, Ill.

[21] Appl. No.: 921,837

[22] Filed: Jul. 3, 1978

[51] Int. Cl.[3] .............................................. B65G 65/48

[52] U.S. Cl. ...................................... 222/108; 141/88; 222/228; 222/410; 222/462; 366/295

[58] Field of Search ............... 222/108, 109, 110, 111, 222/146 R, 146 C, 227, 228, 239, 240, 241, 242, 410, 460-462, 575, 168, 168.5, 185; 221/203; 366/293, 295; 4/252 A; 141/88, 364; 241/282.1, DIG. 17; 62/344

[56] References Cited

U.S. PATENT DOCUMENTS

| | | | |
|---|---|---|---|
| 509,488 | 11/1893 | Potter | 222/239 |
| 861,079 | 7/1907 | Benner | 222/242 |
| 2,156,174 | 4/1939 | Braatz | 4/252 A |
| 3,327,902 | 6/1967 | Alterwitz | 222/108 |
| 3,406,871 | 10/1968 | Hoenisch | 222/168 X |
| 3,587,938 | 6/1971 | Brown | 222/228 |
| 4,066,164 | 1/1978 | Easton | 222/228 X |
| 4,123,918 | 11/1978 | Kohl et al. | 222/410 X |
| 4,139,126 | 2/1979 | Krasner et al. | 241/282.1 X |

*Primary Examiner*—Charles A. Marmor
*Assistant Examiner*—Fred A. Silverberg
*Attorney, Agent, or Firm*—Harness, Dickey & Pierce

[57] ABSTRACT

An ice dispensing machine including an ice storage bin having a rotatable ice agitating mechanism disposed internally thereof and adapted to move ice within the bin toward a discharge opening located in the bottom wall of the bin; an ice discharge chute is disposed below the opening and includes a wall portion inclined upwardly in the direction of rotation of the ice within the bin to prevent ice jamming between the agitating mechanism and the periphery of the discharge opening; a sink assembly is arranged below the ice dispensing area of the machine and includes a sink that is removably mounted so that it may be conveniently detached for inspection, cleaning and the like without requiring disconnection from associated drain conduits and the like.

20 Claims, 10 Drawing Figures

FIG. 3.
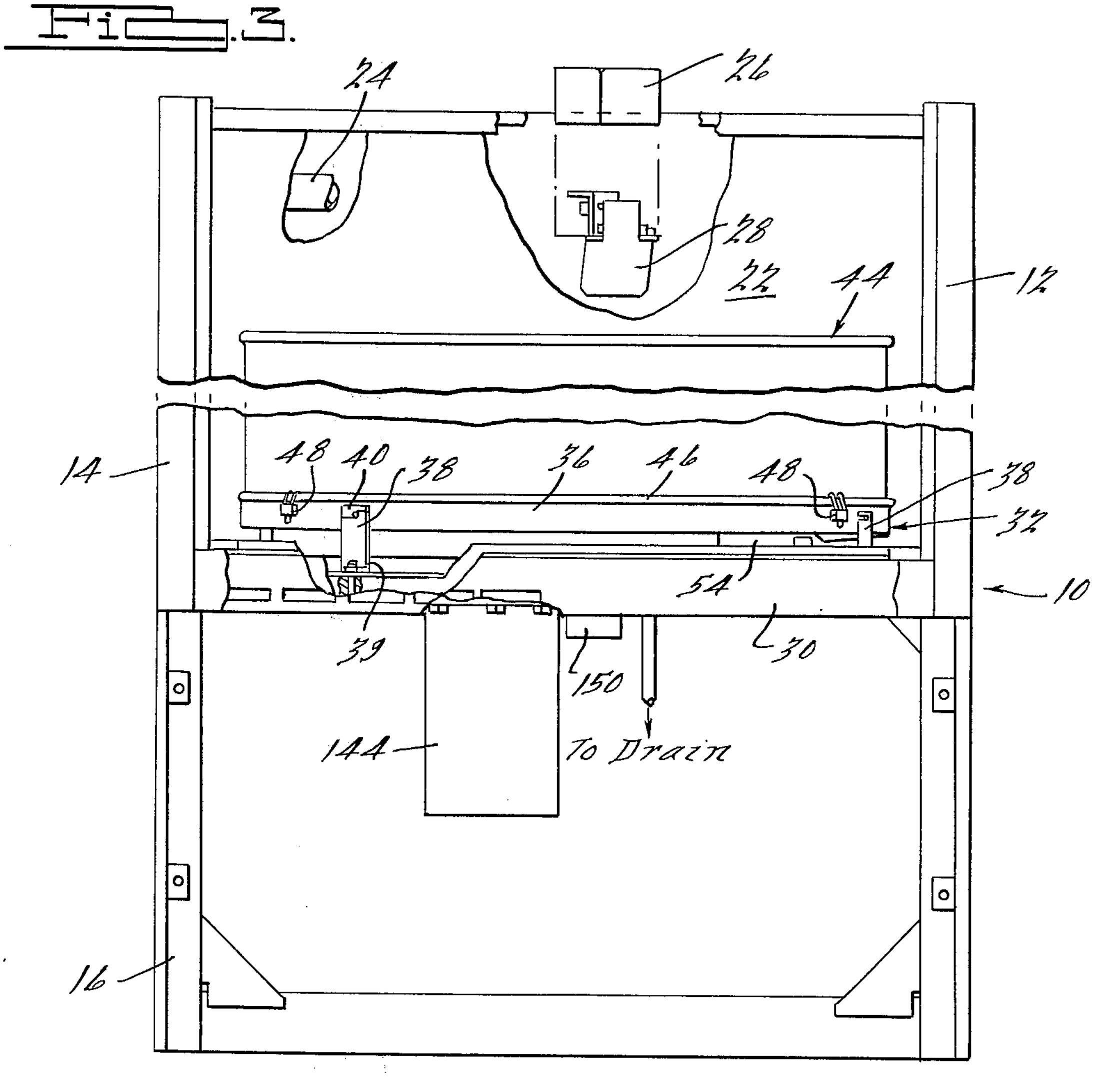
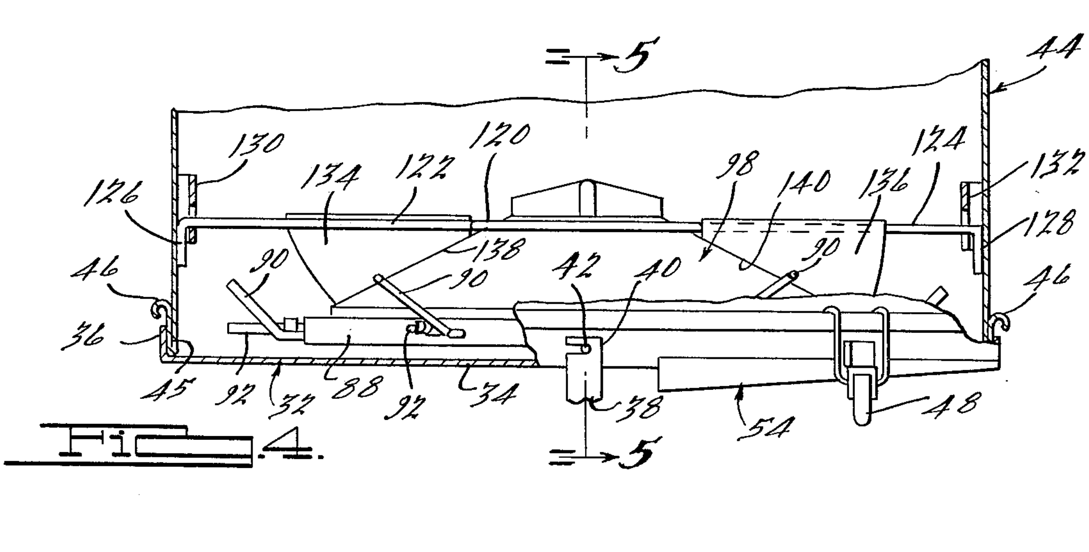
FIG. 4.

FIG. 5.
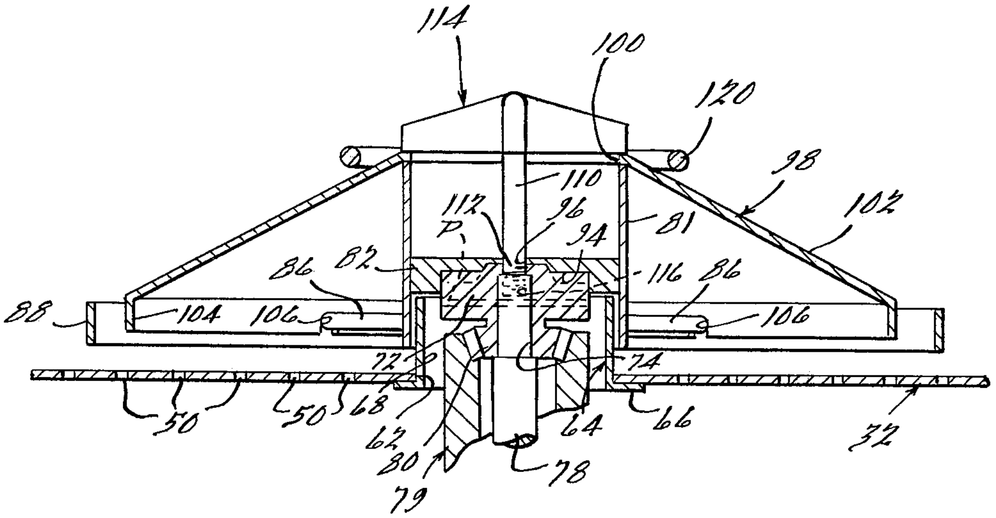
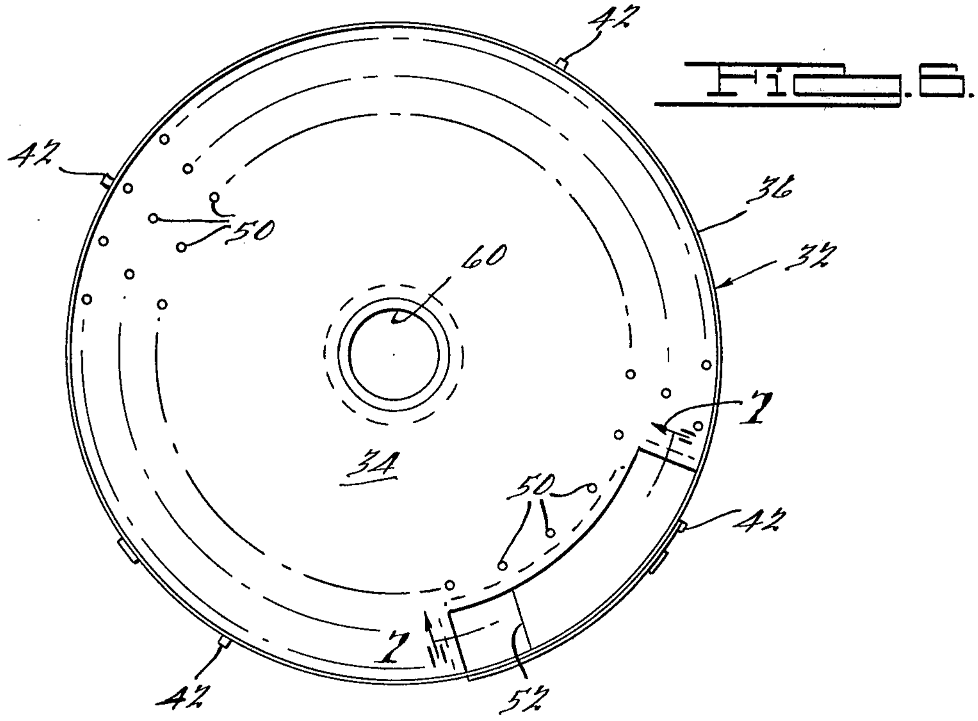
FIG. 6.
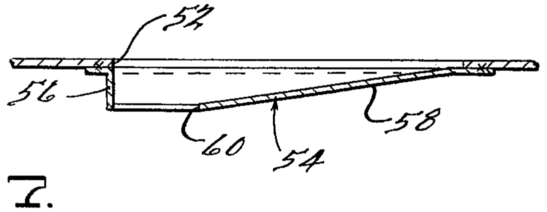
FIG. 7.

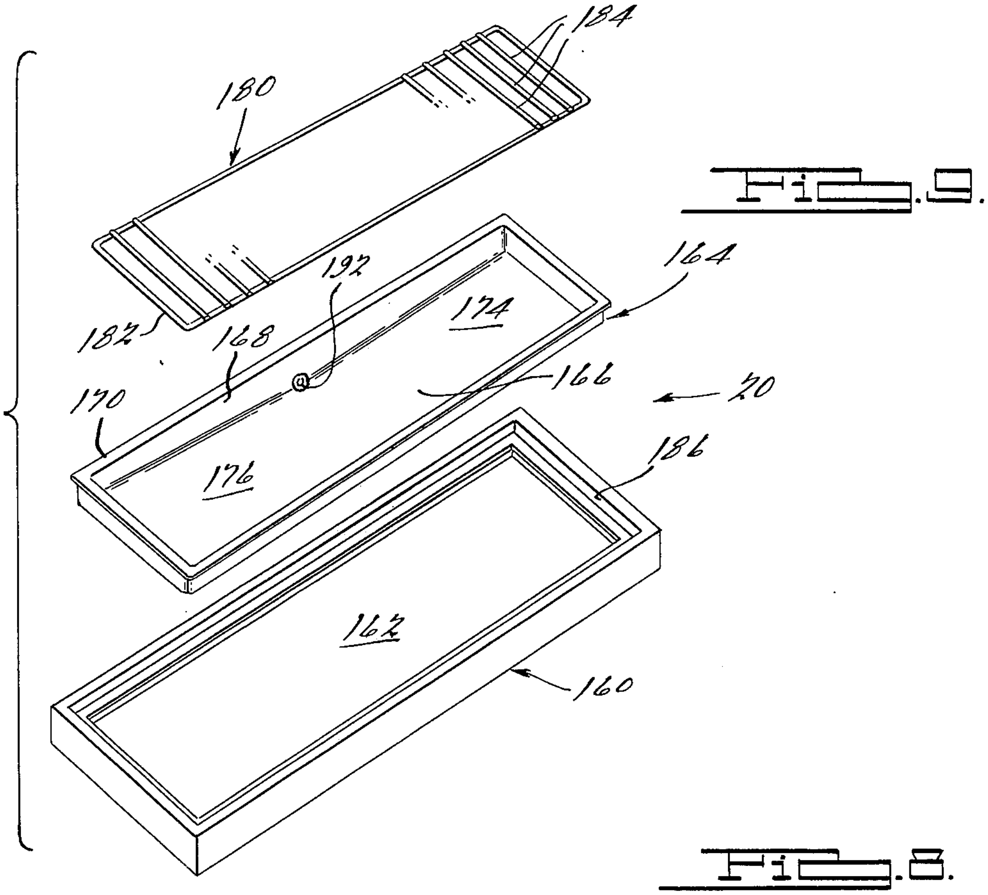
Fig. 9.
Fig. 8.
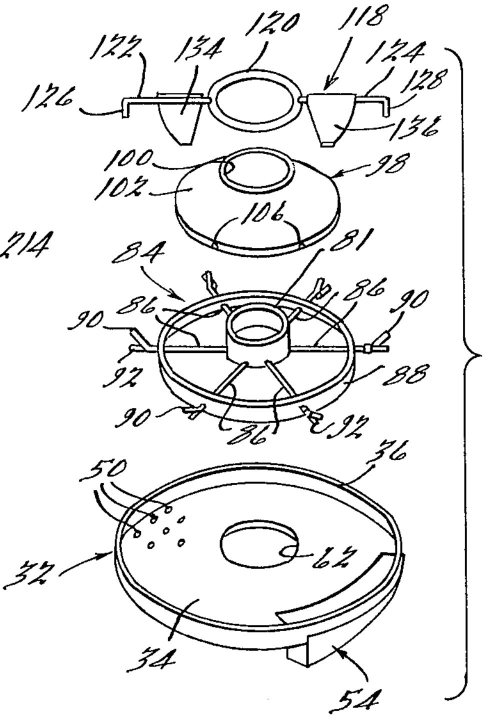
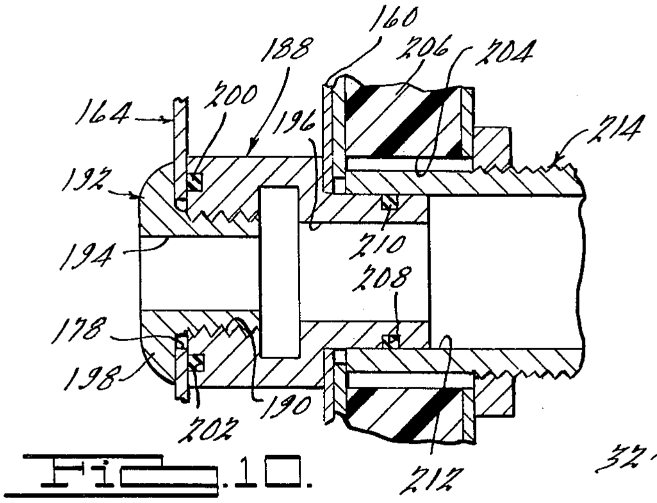
Fig. 10.

ICE DISPENSING MACHINE HAVING AN AGITATOR AND A FIXED DEFLECTOR

BACKGROUND AND SUMMARY OF THE INVENTION

The present invention relates generally to ice dispensing machines, and more particularly, to a new and improved ice dispensing machine which overcomes a number of advantages attendant similar type machines heretofore known and used. In particular, the present invention is directed toward an ice dispensing machine of the type having a rotational or rotary ice moving mechanism disposed within the ice storage bin thereof. The ice moving mechanism is adapted to move ice in pallet or cube form toward a discharge opening located within the ice storage bin bottom, the discharge opening being communicable via a suitable ice shutter mechanism with an ice discharge spout by which ice is selectively discharged to a suitable receptacle, such as a drinking glass or the like. Although rotatable ice moving mechanisms have heretofore been known and used in ice dispensing machines of the prior art, such as is shown in U.S. Pat. Nos. 3,268,118 and 3,406,871, such prior art arrangements have been subject to occasional objection that ice has frequently become jammed or lodged between the rotatable ice moving mechanism and the adjacent portion of the storage bin, thereby temporarily rendering such apparatus inoperative for dispensing ice. The present invention provides a new and improved discharge chute construction which is intended to obviate such objectionable features of similar type machines heretofore known and used, the discharge chute being formed with a ramp that is inclined upwardly in the direction of rotational movement of the ice within the storage bin. The leading edge of the chute comprises a generally vertically downwardly disposed section over which ice being moved by the ice moving mechanism is traversed, with such ice being communicated downwardly through a suitable discharge opening located vertically below the bottom of the storage bin.

Another feature of the present invention resides in the provision of a new and improved ice moving and agitating mechanism which includes a rotatable agitator cone that is rotatable along with a plurality of ice moving fingers which extend generally radially outwardly from the lower end of the agitator cone. These fingers are provided with deflectable or deformable ice engaging elements which facilitate the movement of ice within the storage bin toward the discharge opening therein and which minimize the possibility of ice becoming jammed between the bottom of the storage bin and the moving elements.

Disposed above the agitator cone is a pair of spaced apart upwardly inclined ice deflector or breaker elements which cause the ice adjacent the upper surface of the cone to be periodically moved upwardly and thereafter dropped downwardly onto the upper surface of the cone to effect agitation of the mass of ice within the storage bin.

Another feature of the present invention resides in a new and improved sink assembly which is disposed below the dispensing area of the ice dispensing machine of the present invention. The sink assembly includes a novel sink that is detachably secured with a cooperable fitting on the dispenser housing. With this arrangement, the sink may be conveniently removed for purposes of cleaning and the like without requiring permanent disconnection of any drain lines or the like, as has been the case with similar type prior art arrangements.

It is accordingly a general object of the present invention to provide a new and improved ice dispensing machine.

It is a more particular object of the present invention to provide a new and improved ice dispensing machine which includes means for assuring against the jamming of ice between the rotatable ice moving mechanism and the peripheral portion of the discharge opening.

It is another object of the present invention to provide a new and improved ice dispensing machine, as above described, which includes a novel ice moving and agitating mechanism.

It is yet a further object of the present invention to provide a new and improved ice dispensing machine of the above character that incorporates a new and improved detachably mounted sink assembly for receiving melt water, and the like, and which may be conveniently removed for purposes of cleaning and the like.

It is a further object of the present invention to provide a new and improved ice dispensing machine of the above character which may be provided with liquid dispensing means, whereby ice and liquids, such as soft drinks and the like, may be dispensed from a single machine.

It is still another object of the present invention to provide a new and improved ice dispensing machine of the above character which is of a relatively simple design, is economical to manufacture and will have a long and effective operational life.

Other objects and advantages will become apparent from the following detailed description taken in conjunction with the accompanying drawings.

BRIEF DESCRIPTION OF THE DRAWINGS

FIG. 3 is a front elevational view, partially broken away, of the ice dispensing machine shown in FIG. 1;

FIG. 4 is an enlarged fragmentary cross-sectional view of the ice agitating mechanism embodied in the dispensing machine of the present invention;

FIG. 5 is an enlarged cross-sectional view taken substantially along the line 5—5 of FIG. 4;

FIG. 6 is a top elevational view of the bottom of the ice storage bin of the present invention and discloses the ice discharge spout formed therein;

FIG. 7 is an enlarged fragmentary cross-sectional view taken substantially along the line 7—7 of FIG. 6;

FIG. 8 is an exploded perspective view of the ice agitating mechanism illustrated in FIGS. 4 and 5;

FIG. 9 is an exploded perspective view of the drip sink assembly incorporated in the ice dispensing machine of the present invention; and FIG. 10 is an enlarged fragmentary cross-sectional view of the drain fitting arrangement embodied in the sink assembly of the present invention.

DETAILED DESCRIPTION OF THE DRAWINGS

Figure 1:
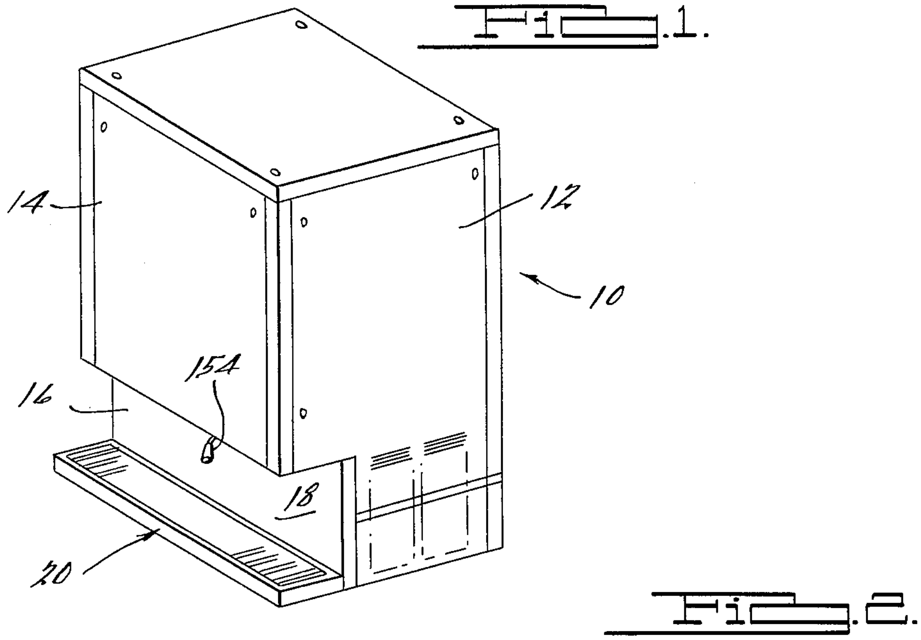
FIG. 1 is an elevated perspective view of an ice dispensing machine in accordance with one preferred embodiment of the present invention.

Referring now in detail to the drawings and in particular, to FIG. 1 thereof, an ice dispensing machine 10, in accordance with one preferred embodiment of the present invention, is shown generally as comprising an external housing or enclosure 12 having an upper housing section 14 and a lower housing section 16, the latter of which defines a recessed dispensing area 18. As will hereinafter be described in detail, ice in "cube" or pellet form is intended to be stored within the upper housing section 14 and is adapted to be selectively dispensed or discharged in metered quantities, either by itself or with an ancillary liquid, such as water, soft drinks, etc., into a suitable receptacle, such as a drinking glass or the like, which is inserted into the dispensing area 18. In accordance with one of the features of the present invention, a drip tray or sink assembly 20 is disposed adjacent the lower portion of the dispensing area 18 for receiving and appropriately carrying away any ice melt water or excess liquid which may be discharged by the machine and not received in the aforementioned receptacle.

Figure 2:
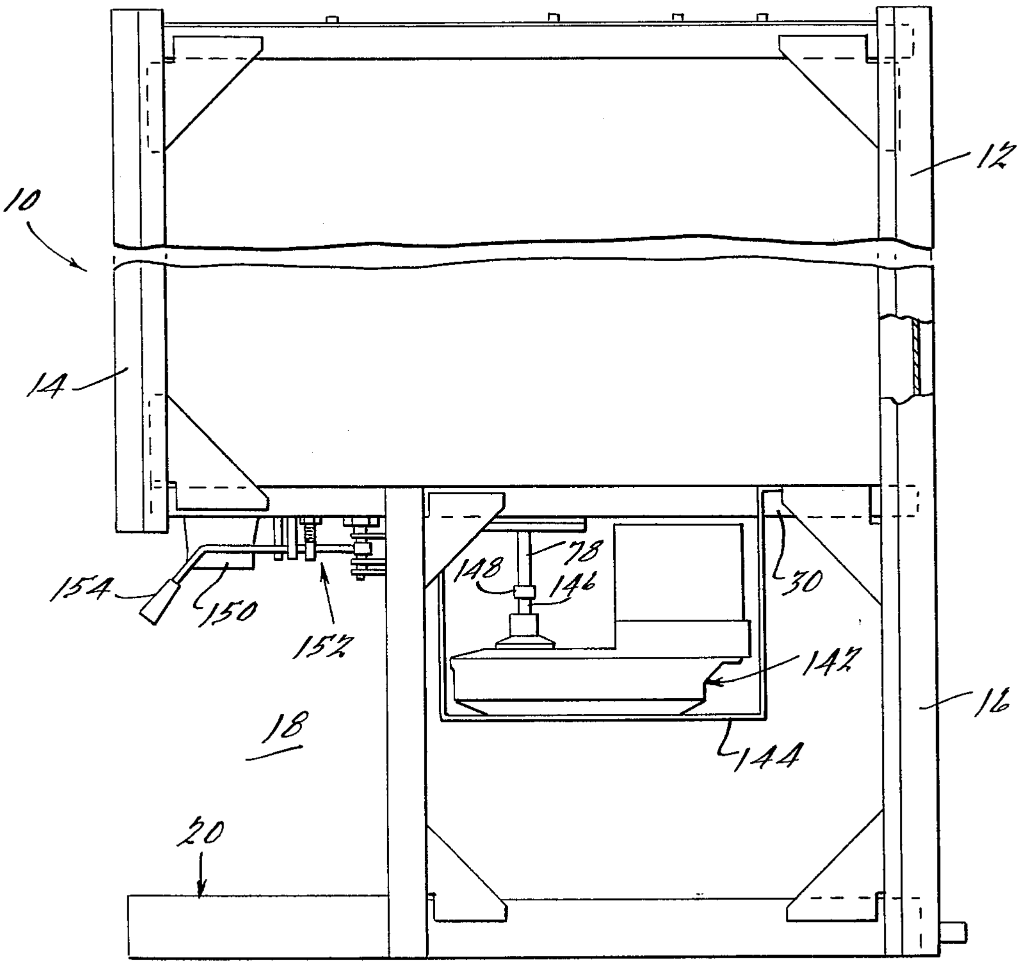
FIG. 2 is an enlarged side elevational view, partially broken away, of the ice dispensing machine illustrated in FIG. 1.

As best seen in FIGS. 2 and 3, the upper housing section 14 of the enclosure 12 defines an ice storage chamber 22 having a suitable insulated liner and which is provided with a suitable source of ice, representatively designated by a conduit 24 which may be communicable with a remotely located ice making machine, not shown. Alternatively, a suitable ice making apparatus may be provided directly within the chamber 22 in those instances where the machine 10 is intended to be entirely self-contained. In either case, ice is intended to be stored within the chamber 22 (as will hereinafter be described), the volume or level of which ice is controlled by a suitable control switch 26 having an ice level sensing element 28 depending downwardly therefrom and adapted to be engaged by the upper surface of the mass of ice within the chamber 22 for controlling operation of the switch 26 and hence energization of the associated ice source supplying ice to the chamber 22, in a manner well known in the art. Various other types of level sensing devices could be satisfactorily employed, such as a thermostation or capacitance type ice level sensing device.

Disposed horizontally between and separating the housing sections 14 and 16 is a generally horizontal partition or mounting pan 30. Arranged above the pan 30 is a generally circular ice storage bin bottom 32 having a generally flat circular bottom section 34 provided with an upstanding peripheral side wall 36. The bin bottom 32 is supported upon the mounting pan 30 by means of a plurality of generally vertically extending mounting legs 38 that are arranged circumferentially around the member 32, with the legs 38 having lower end sections 39 fixedly secured to the pan 30. The upper ends of the legs 30 may be secured to the bin bottom in any one of a number of satisfactory ways. By way of example, the upper ends of the legs 38 may be provided with notched end portions 40 adapted for bayonet-like detachable connection with a plurality of circumferentially spaced, radially outwardly extending bosses 42 formed on the side wall 36 of the member 32, whereby to permit convenient removal of the member 32 for purposes of cleaning, inspection, etc.

Mounted upon the bin bottom 32 is an upstanding annular storage bin 44, the diameter of which is approximately equal to the diameter of the bottom 32, and which has a reversely folded or formed lower edge portion 45 adapted to be nestingly received within the bin bottom 32 in a manner best shown in FIG. 4. The reversely folded lower edge 45 is formed with a radially outwardly directed bead or ridge 46 which is adapted to be detachably engaged by a plurality of luggage-type over-center latches 48 that are affixed to the side wall 36 of the member 32, whereby to removably retain the storage bin 44 in its operative position shown in FIGS. 3 and 4. As will be appreciated by those skilled in the art, the latches 48 may be conveniently released to permit removal of the bin 44 so as to facilitate inspection or cleaning of the ice storage chamber defined by the bin 44 and bin bottom 32.

As shown in FIG. 6, the bin bottom 32 is formed with a plurality of perforations 50 which permit ice melt water to drain downwardly into a suitable liner, from where such water may be communicated to a suitable system drain, as indicated in FIG. 3. Additionally, the bin bottom 32 is formed with a generally arcuate-shaped opening 52 adjacent one edge portion thereof, the opening 52 being communicable with an ice discharge chute 54 that is secured to the underside of the bin bottom 32 in the manner best shown in FIG. 7. As illustrated, the chute 54 includes a generally vertically extending section 56 that is generally vertically aligned with one radially disposed edge of the opening 52. The chute 54 also includes an upwardly inclined section 58 which terminates adjacent the opposite side edge of the opening 52, with the sections 56, 58 defining a generally rectangularly-shaped ice discharge opening 60 through which ice stored within the bin 44 may be communicated to the ice dispensing area 18, in a manner later to be described. In accordance with one of the features of the present invention, the section 58 of the chute 54 is inclined upwardly in the direction which ice within the bin 44 moves or rotates so as to prevent ice jamming as it is discharged from the bin 44, as will be described in connection with the overall operation of the dispensing machine 10 of the present invention. In the preferred embodiment of the present invention disclosed herein, the arcuate length of the opening 52 and hence the length of the discharge chute 54 is approximately 41°, although discharge openings 52 of somewhat different arcuate lengths and angles are intended to be encompassed within the scope of the present invention.

As best seen in FIG. 5, the bin bottom 32 is formed with a central axial opening 62 within which a generally upstanding annular sleeve member 64 is disposed. The lower end of the sleeve member 64 is formed with a radially outwardly extending flange portion 66 which is secured to the underside of the central section 34 of the member 32. Disposed within the open upper end 68 of the sleeve member 64 is an annular drive hub assembly 72 that is formed with a central, axially extending bore 74 within which the upper end portion 76 of an axially disposed drive shaft 78 is located. A radially disposed cross-pin P drivingly connects the hub assembly 72 on the upper end of the shaft 28. The shaft 78 extends axially downwardly through a tubular support structure 79 and is rotatably driven in a manner hereinafter to be described. A suitable bearing assembly 80 on the upper end of the support structure 79 journal supports the upper end of the shaft 80, as illustrated. Arranged coaxially of the sleeve member 64 and drive shaft 78 and arranged radially outwardly from the member 64 is an annular or tube-like support member 81 that projects upwardly beyond the upper flange portion 68 of the sleeve member 64. The support member 81 is provided with an internal, radially disposed support disc 82 which is fixedly secured by means of suitable screws, bolts or the like (not shown) within the interior of the member 80. The support member 81, as best seen in FIG. 8, comprises the central component of an annular or wheel-shaped agitator assembly, generally designated by the numeral 84, which further includes a plurality of circumferentially spaced, radially outwardly extending spoke elements 86 that have their inner ends fixedly secured to the outer periphery of the support member 80. The assembly 84 also comprises an annular or ring-shaped member 88 which is spaced radially outwardly from the member 80 and has the outer ends of the spoke elements 86 projecting therethrough so as to define outwardly depending ice agitating fingers 90 on the outer end of each of the elements 86. The fingers 90 are preferably inclined upwardly in the manner best shown in FIG. 4 so as to project into the mass of ice stored within the bin 44. Additionally, each of the fingers 90 is preferably provided with a radially outwardly extending deformable or compliant ice agitating element 92 which may be fabricated of a resilient conduit material, which elements 92 cooperate with the fingers 90 to effect agitation of the ice stored within the bin 44 upon rotation of the assembly 84. Such rotation is achieved through the provision of an annular recess 94 (see FIG. 5) formed in the underside of the support disc 82 which provides for nesting engagement of the upper side of the drive hub assembly 72 therewithin. Preferably, the interior of the recess 94 and upper side of the assembly 72 are provided with matingly engageable ridges or recesses so as to provide a driving spline relationship between the hub assembly 72 and support collar 82, whereupon rotation of the drive shaft 78 and drive hub assembly 72 will result in concomitant rotation of the support disc 82 and the annular support member 80 and plurality of spoke elements 86 secured thereto.

The support disc 82 is formed with a central axial opening 96 which is coaxially aligned with the center of an agitating cone, generally designated by the numeral 98, that is mounted above the agitator assembly 84, as best seen in FIGS. 5 and 8. The agitating cone 98 is formed with a central opening 100 and includes a frusto-conical section 102 extending radially outwardly and downwardly from the periphery of the opening 100. The section 102 is formed with a downwardly depending flange portion 104 which is formed with a plurality of circumferentially spaced notches or recesses 106 that correspond in number to and are adapted to nestingly receive the plurality of spoke elements 86, as best depicted in FIG. 5. Extending downwardly through the opening 100 is a generally axially located retaining stud 110 having an externally threaded lower end portion 112 and an enlarged diameter cap assembly 114. As best seen in FIG. 5, the threaded end portion 112 of the stud 110 is adapted to be threadably received within an internally threaded bore 116 formed in the drive shaft upper end section 76, whereby to clampingly secure the agitating cone 98 upon the upper end of the support member 81 and whereby to assure that the cone 98 will rotate concomitantly with the agitator assembly 84 and drive shaft 78, as will hereinafter be described.

Mounted directly above the agitating cone 98 is an ice breaker assembly, generally designated by the numeral 118, and comprising a central annular ring 120 that is arranged coaxially of the shaft 78 and is disposed directly above the section 102 of the agitating cone 98. The ring 120 has a pair of diametrically opposed support rods 122 and 124 secured thereto and extending radially outwardly therefrom in the manner best seen in FIG. 4. The rods 122, 124 are formed with downwardly depending terminal end sections 126 and 128, respectively, which are not rotatably secured within suitable retaining brackets 130 and 132, respectively that are secured to diametrically opposed locations on the inner wall of the storage bin 44. The brackets 130, 132 are provided with suitable recesses or notches which removably receive the end sections 126, 128 to permit convenient removal of the breaker assembly 118 for purposes of cleaning, etc., and to provide access to the agitating cone 98 and agitator assembly 84. The support rods 122, 124 are provided with downwardly depending ice deflecting blades 134 and 136, respectively, which are fixedly secured to the rods 122, 124 and have their lower edges 138, 140 disposed adjacent the upper surface of the agitating cone 98, as best seen in FIG. 4. The deflecting blades 134, 136 are inclined upwardly toward the direction of ice movement which occurs within the storage bin 44 upon rotation of the agitator assembly 84 and agitating cone 98, and by virtue of the fact that the breaker assembly 118 is fixedly mounted within the bin 44, that portion of the mass of ice located adjacent the upper surface of the cone 98 will be caused to move upwardly over the upper surface of the deflecting blades 134, 136 and then drop downwardly over the upper edges thereof to assure continuous agitation of the mass of ice and prevent bridging thereof which might otherwise occur so as to prevent ice from dropping freely downwardly through the openings 52, 60 during an ice discharge operation.

Rotation of the drive shaft 78, and hence rotation of the agitator assembly 84 and agitating cone 98, is achieved by means of a gear motor assembly 142 which is disposed below the mounting pan 30 and operatively supported upon a suitable support bracket or platform, generally designated by the numeral 144. The gear motor assembly 142 is intended to be energized by any suitable source of electrical energy, such as would be typically available, whereby to effect rotation of an output shaft 146 that extends vertically upwardly in the manner best seen in FIG. 2 and which is drivingly connected by suitable coupling means 148 to the drive shaft 78.

The opening 60 of the chute 54 is communicable with a downwardly extending ice discharge spout 150 located in the upper end of the ice dispensing area 18, as best seen in FIG. 2. Control of the flow of ice through the delivery spout 150 is achieved via a shutter assembly, generally designated by the numeral 152, which is intended to be operated by means of a suitably manually engageable handle or arm 154. The construction and operation of the actuating handle 154 and shutter assembly 152 may be of any one of a number of satisfactory arrangements known in the prior art, and the present invention is not intended to be limited in scope to any specific type of shutter and shutter actuting means. By way of example, however, the shutter assembly 152 may be designed, such as that the spout 150 is normally closed by a pivotably or slidably disposed shutter element (not shown), and at such time as the actuating handle 154 is appropriately biased by the machine operator, the shutter element will be moved to a position providing communication of ice from the opening 60 to the spout 150, whereby a predetermined quantity of ice theretofore retained within the spout 150 by the shutter assembly 152 will be discharged through the spout 150 into a suitable receptacle placed into the dispensing area 18 by the machine operator. The actuating arm 154 may, if desired, be connected by suitable control means, i.e., electrical switches, etc., to the gear motor assembly 152, whereupon actuation of the handle 154 will result in energization of the gear motor 152 so that ice will be continuously dispensed through the delivery spout 150 as long as the actuating arm 154 remains actuated. Alternatively, a suitable timing mechanism may be employed wherein actuation of the handle 154 will initiate energization of the gear motor 152 to effect the dispensing of ice through the delivery spout 150 for a predetermined timed period, and at the end of such time period, the gear motor assembly 152 will be automatically deenergized to end the vend cycle. Such timed dispensing may be achieved, by way of example, through the use of a suitable electronic time delay device in the associated electronic circuitry, or instead, may be achieved by a suitable cam and cam follower arrangement operating in conjunction with the drive shaft 78 or the like, as will be appreciated by those skilled in the art.

With reference now to FIGS. 1 and 9, the drip tray or sink assembly 20 is shown as comprising a generally rectangular housing 160 which, in accordance with one of the principles of the present invention, is adapted to be detachably connected to the adjacent portion of the lower housing section 16. The housing 160 defines a generally rectangular-shaped upwardly facing recessed area 162 that nestingly receives a generally complementary-shaped sink liner 164 which may be fabricated of a suitable molded or otherwise formed plastic material having the desired sanitary and aesthetic requirements. The liner 164 includes a bottom section 166 and an upstanding peripheral side wall section 168 which is in turn formed with a generally outwardly (horizontally) projecting flange portion 170. The bottom section 166 of the liner 164 is formed with downwardly converging bottom portions 174 and 176 which are intended to direct any liquids dropped downwardly into the liner 164 toward the central portion thereof wherein such liquids may be communicated through a drain opening 178 formed in the peripheral wall section 168 adjacent the intersection of the bottom portions 174, 176. The sink assembly 20 also includes a generally rectangular-shaped grill or grate 180 having a peripheral frame 182 of the same general configuration as the recessed area 162 of the housing 160, with a plurality of spaced parallel support elements 184 extending between the longitudinally extending opposed sides of the frame 182, as best seen in FIG. 9. The housing 160 is formed with a recessed shoulder 186 around the outer periphery of the recessed area 162, which shoulder 186 is adapted to have the peripheral flange portion 170 of the liner 164 received therein. Additionally, the dimensions of the shoulder 186 are intended to be complementary in size and shape with regard to the grill 180, whereby the grill 180 may be nestingly received upon the shoulder 186 directly above the flange portion 170 of the liner 164. As best seen in FIG. 10, a generally tubular drain fitting 188 is disposed within the housing 160 and is axially aligned with the drain opening 178 in the liner 164. The end of the fitting 188 adjacent the liner 164 is internally threaded, as seen at 190, and adapted to threadably receive the inner end of a cooperable fitting 192 that extends through the opening 178 and is formed with a central bore 194 communicable with the bore 196 of the fitting 188. The fitting 192 includes an outer peripheral flange or shoulder 198 which compressingly engages the portion of the liner 164 circumjacent the opening 178 and effects sealing engagement of the outer side thereof with a suitable O-ring sealing element 200 disposed in an annular recess 202 in the end of the fitting 188.

The opposite or outer end of the fitting 188 is disposed within a recess or cavity 204 formed in the structural foam material 206 that fills the underside of the housing 160, with the end of the fitting 188 which is disposed within the cavity 204 being formed with an annular recess 208 that is provided with an O-ring sealing element 210 adapted for sealing engagement with the inner periphery 212 of a female fitting 214 that is fixedly secured to the face of the lower housing section 16 and which is communicable with a suitable drain line or the like thereof. The fitting 214 projects outwardly from the housing section 16 such that upon proper alignment of the fitting 188 therewith and movement of the assembly 20 toward the face of the housing section 16, the end of the fitting 188 disposed adjacent the housing 160 will be received within the end of the fitting 214 and end of the fitting 214 will concomitantly be received within the cavity 204 so that the entire sink assembly 20 may be positioned directly adjacent the forward side of the housing section 16. Suitable releasable bracket means (not shown) may be utilized in addition to the fittings 188, 204 to support the sink assembly 20 in its operative position upon the housing section 16.

The aforesaid arrangement provides a significant improvement over various prior art sink designs in view of the fact that the entire sink assembly 20 may be conveniently removed for purposes of cleaning, inspection, etc., by simply withdrawing the fitting 188 from the fitting 214, as compared to prior art arrangements wherein the sink liner either had to be disconnected through the use of suitable tools from the associated drain system, or when being removed, required the inconvenient manipulation of flexible drain conduits.

As previously mentioned, one of the primary features of the present invention resides in the construction and operation of the discharge chute 54 and its operative relationship to the agitator cone 98 and agitator assembly 84. In particular, by virtue of the fact that the discharge chute 54 comprises the vertically downwardly extending section 56 at the leading edge thereof, i.e., the edge of the chute which ice being rotated within the storage bin 44 initially encounters, such ice will drop downwardly through the opening 52 and subsequently through the opening 60 located therebelow. In the event portions of the ice located in the lowermost part of the ice mass do not drop directly through the opening 60, such ice will ride upwardly along the inclined ramp section 58 and not become jammed or lodged between the underside of the agitator cone 98 and/or agitator assembly 84. Additionally, by virtue of the fact that the deformable members 92 are adapted to flex somewhat as they engage the ice within the storage bin 44, the possibility of ice becoming lodged or jammed between the outer periphery of the agitator assembly 84 and the bin bottom 32 is minimized to the extreme, with the result that uninterrupted and service-free operation of the machine 10 can be assured.

As hereinbefore discussed, it is contemplated that the ice dispensing machine 10 of the present invention may be utilized for dispensing only ice, or alternatively, may be adapted for dispensing ice and water, either carbonated or non-carbonated, and/or soft drinks or flavor syrups therefor. Since a wide variety of different types of liquid dispensing means may be incorporated in the dispensing machine 10, no specific type of liquid dispensing structure has been disclosed herein. By way of example, however, it is contemplated that suitable selector means may be provided on the front or forward side of the enclosure 12 so that the machine operator can select a particular flavor soft drink and/or choose to have only ice or ice and water be dispensed during a vend cycle. Suitable position sensing means may be provided adjacent the actuating handle or arm 154, whereupon shifting movement thereof to open the associated shutter element will effect actuation of a suitable solenoid operated liquid valve of the appropriate flavored drink source to be dispensed so that simultaneous dispensing of liquid with the ice will be achieved.

It will be appreciated, of course, that the present invention is not intended to be limited to a construction wherein the discharge chute 54 comprises a separate structural component from the bin bottom 32, since these two components could be fabricated integrally of one another, such as out of a suitable stainless steel or plastic material which may be easily cleaned in order to satisfy the sanitary requisites of food dispensing equipment. In this regard, another particularly important feature of the present invention will be seen from the fact that the various components of the ice moving and agitator mechanism may be conveniently removed through successive disassembly of the ice breaker assembly 118, agitator cone 98 and agitator assembly 84 in order to facilitate cleaning and maintenance thereof.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

I claim:

1. In an article dispensing apparatus, an article storage area having a bottom closure portion and upstanding walls defining a storage chamber from which articles are to be selectively dispensed, a discharge opening in said bottom closure of said chamber and means for moving articles therewithin toward said opening, and means for preventing articles from becoming jammed between said bottom closure and said article moving means as said articles move toward said opening, said jam prevention means including discharge chute means disposed below said opening and including a ramp portion inclined upwardly in the direction in which articles are moved toward said opening by said article moving means, said discharge chute means further comprising an end section extending downwardly adjacent one peripheral edge portion of said discharge opening, with said ramp portion extending upwardly from the lowermost part of said end section to a position adjacent the peripheral edge portion of said opening opposite said one peripheral edge portion thereof.

2. The invention as set forth in claim 1 which includes a rotatable article moving means for moving articles within said storage area toward said discharge opening.

3. The invention as set forth in claim 1 which includes a rotatable article moving means disposed directly above said bottom closure portion and operable to move articles within said chamber toward said opening, and wherein said ramp portion is inclined upwardly in the direction of rotation of said article moving means.

4. The invention as set forth in claim 3 wherein said article storage area comprises an ice storage bin, and wherein said article moving means comprises a combination ice moving means and means for agitating a mass of ice disposed within said bin.

5. The invention as set forth in claim 4 which includes an ice discharge spout and means for communicating ice discharged through said opening to said spout, and shutter means for controlling the dispensing of ice from said spout.

6. The invention as set forth in claim 1 wherein said article moving means comprises a generally conically-shaped agitator member and means including a plurality of radially disposed article moving fingers disposed around said member and adapted for rotation within said member, and means including at least one relatively fixedly located article deflecting element disposed adjacent the upper surface of said conically-shaped member for causing articles moved by said member and said fingers to be deflected upwardly and thereby effect agitation of said articles.

7. The invention as set forth in claim 6 wherein said storage area comprises a generally circular storage bin, said agitator member being rotatably mounted coaxially of said bin, and wherein said plurality of radially disposed fingers extend radially outwardly from the outer periphery of said agitator member and are rotatable concomitantly therewith.

8. The invention as set forth in claim 1 which includes a sink assembly disposed below said opening and including a support structure defining an upwardly facing recessed area, first fluid fitting means disposed within said recessed area and being communicable with a remote location, a sink liner member corresponding generally in size and shape to said recessed area and adapted to be removably disposed therewithin, second fluid fitting means on said sink member and having a first portion communicable with the interior of said sink member and a second portion detachably cooperating with said first fluid fitting means, whereby when said sink member is disposed within said recessed area, materials dropping into said sink member will be communicated to said remote location via said fluid fittings.

9. In an article dispensing apparatus, an article storage area from which articles are to be dispensed, a combination means for agitating articles within said area and for moving said articles toward a discharge location, said means comprising a generally conically-shaped agitator member and means including a plurality of radially disposed article moving fingers disposed around said member and adapted for rotation within said area, and means including at least one relatively fixedly located article deflecting element disposed above and adjacent the upper surface of said conically-shaped member and inclined upwardly in the direction of rotation of said agitator member for causing articles moved by said member and said fingers to be deflected upwardly over said element and subsequently drop downwardly off therefrom and thereby effect agitation of said articles.

10. The invention as set forth in claim 9 wherein said storage area comprises a generally circular storage bin, said agitator member being rotatably mounted coaxially of said bin.

11. The invention as set forth in claim 10 wherein said plurality of radially disposed fingers extend radially outwardly from the outer periphery of said agitator member and are rotatable concomitantly therewith.

12. The invention as set forth in claim 11 wherein said storage area includes a bottom closure portion and upstanding walls defining a storage chamber from which articles are to be selectively dispensed, a discharge opening in said bottom closure portion of said chamber, and means for preventing articles from becoming jammed between said bottom closure and said article moving means as said articles move toward said discharge opening.

13. The invention as set forth in claim 12 wherein said jam preventing means includes a discharge chute comprising an end section extending downwardly adjacent one peripheral edge portion of said discharge opening, and a ramp portion extending upwardly from the lowermost part of said end section to a position adjacent the peripheral edge portion of said opening opposite said one portion thereof.

14. The invention as set forth in claim 13 wherein said ramp portion is inclined upwardly in the direction of rotation of said agitator member.

15. The invention as set forth in claim 14 which includes a pair of upwardly inclined article deflecting elements.

16. The invention as set forth in claim 9 which comprises a pair of diametrically opposed article deflecting elements that are inclined upwardly in the direction of movement of said agitator member.

17. The invention as set forth in claim 9 wherein each of said fingers is provided with a relatively deformable article engaging member.

18. The invention as set forth in claim 9 which includes a sink assembly disposed below said discharge location and including a support structure defining an upwardly facing recessed area, first fluid fitting means disposed within said recessed area and being communicable with a remote location, a sink liner member corresponding generally in size and shape to said recessed area and adapted to be removably disposed therewithin, second fluid fitting means on said sink member and having a first portion communicable with the interior of said sink member and a second portion cooperable with said first fluid fitting means, whereby when said sink member is disposed within said recessed area, materials dropping into said sink member will be communicated to said remote location via said fluid fittings.

19. The invention as set forth in claim 18 wherein said dispensing mechanism comprises an ice dispensing mechanism and wherein said sink assembly is adapted to receive ice melt water.

20. The invention as set forth in claim 19 wherein said remote location comprises a drain system for said ice dispensing mechanism.

* * * * *